United States Patent Office 3,180,891
Patented Apr. 27, 1965

---

3,180,891
METHOD FOR PREPARING THIOFORMANILIDE
Samuel E. Ellzey, Jr., and Charles H. Mack, New Orleans, La., assignors to the United States of America as represented by the Secretary of Agriculture
No Drawing. Filed Feb. 1, 1963, Ser. No. 256,198
5 Claims. (Cl. 260—567)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The present invention relates to the preparation of thioformanilide and more particularly to a novel and improved method for the preparation of thioformanilide.

Thioformanilide, which is a known compound, is useful as an acaricide and an insecticide (ref. U.S. Patent Number 2,765,313), as well as an antimycotic agent. It is the object of this invention to provide a novel and improved method for producing thioformanilide.

The process of the present invention comprises the steps of reacting together phenyl isothiocyanate and sodium borohydride in a solvent suitable for bringing about mutual solubility of the reactants at a temperature not to exceed 40° C. and after addition of an aqueous acid solution, recovering the thioformanilide from the reaction mixture by conventional filtration procedures.

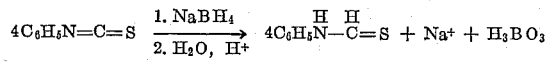

It has been found, in accordance with the present invention, that when the sodium borohydride is present in the reaction mixture in excess, i.e., in amounts greater than stoichiometric amounts, the reaction proceeds rapidly and conversion of the phenyl isothiocyanate to the desired thioformanilide occurs in high yield.

It is essential that the reaction temperature not be allowed to exceed about 40° C., for reaction in excess of this temperature will promote further reduction to N-methylaniline, although some thioformanilide may be isolated in very low yield.

There is no lower limit on the reaction temperature provided a homogeneous solution is maintained and sufficient time is allowed for completion of the reaction. A preferred temperature range is 10° to 40° C.

A solvent is employed in the reaction mixture to bring about mutual solubility of the reactants. Suitable solvents are the dimethyl ether of diethylene glycol, dioxane, and the like.

The thioformanilide may be recovered from the reaction mixture in any suitable manner. Preferably the reaction mixture is poured into a large excess of ice water while the resultant mixture is vigorously stirred, followed by acidification with hydrochloric acid to decompose any unreacted sodium borohydride as well as the intermediate boron-containing complex. At this stage it is preferable but not essential to heat the resulting acidified reaction mixture to about 70° C. while continuing the vigorous stirring in order to remove the dissolved gases as well as to separate the sticky, insoluble reaction product. Cooling the aqueous mixture in an ice bath re-precipitates the thioformanilide which is then collected on a filter, and recrystallized from boiling water. These steps are well known in the art and need not be further elaborated.

The more powerful reducing agent, lithium aluminum hydride, is known to reduce phenyl isothiocyanate to N-methylaniline without producing the product of the present invention, thioformanilide. Successful production of thioformanilide by reduction of phenyl isothiocyanate with a complex metal hydride therefore depends in part on the use of a highly selective hydride such as sodium borohydride.

The following examples illustrate the novel and improved method for the preparation of thioformanilide in accordance with the invention but are not to be construed as defining the limits of the invention.

EXAMPLE 1

To 0.95 gram (0.025 mole) of sodium borohydride dissolved in 15 ml. of the dimethyl ether of diethylene glycol placed in a flask fitted with a stirrer and thermometer was added dropwise during 10 minutes 6.75 grams (0.05 mole) of phenyl isothiocyanate while maintaining the reaction temperature at 40° C. with external cooling. After the addition was completed the yellow reaction mixture was poured into 250 ml. of ice water and cautiously acidified with 8 ml. of 6 N HCl solution. In order to disperse the sticky reaction product the acidified mixture was heated to 70° C. while stirring vigorously and then cooled in an ice bath. Filtration yielded 3.9 grams (a yield of 57%) of crude thioformanilide possessing a melting point of 135° C. Recrystallization of the product from water yielded pure thioformanilide, melting point 138° C.

EXAMPLE 2

A combination employing the same reactants as in Example 1 was carried out for 1 hour at 25° C. using a molar ratio of reactants of 1:1. The recovered crude thioformanilide corresponded to a 49% yield.

EXAMPLE 3

A combination employing the same molar ratio of reactants as in Example 1 was carried out for 1.5 hours at 10° to 15° C. The recovered crude thioformanilide corresponded to a 70% yield.

EXAMPLE 4

To a solution of 1.90 grams (0.05 mole) of sodium borohydride in 20 ml. of the dimethyl ether of diethylene glycol was added dropwise 6.75 grams (0.05 mole) of phenyl isothiocyanate over a period of 10 minutes during which time the temperature rose to 90° C. and was maintained at this temperature for one hour with external heating. The reaction mixture containing a white solid was transferred to a beaker containing 400 ml. of ice water. After cautiously acidifying the contents of the beaker with 20 ml. of 6 N HCl solution and cooling, 0.5 gram of a solid melting over 200° C. was removed by filtration. The filtrate was made alkaline with 25% sodium hydroxide solution, and subjected to steam distillation. The steam distillate was thoroughly extracted with ether, and after drying the ether solution and evaporation of the ether, 6.7 grams of a brown liquid was obtained and analyzed by gas chromatography. The liquid consisted of 60.8% N-methylaniline, 1.3% aniline, 35.1% dimethyl ether of diethylene glycol, and 2.8% low boiling solvent. No thioformanilide was recovered.

The following table shows the data presented in the examples above:

*Table I*

| Example | Molar Ratio of Phenylisothiocyanate to Sodium Borohydride | Reaction, Time/Temp. | Yield, percent |
|---|---|---|---|
| 1 | 1 : 0.5 | 10 min./40° C | 57 |
| 2 | 1 : 1 | 60 min./25° C | 49 |
| 3 | 1 : 0.5 | 90 min./10° C | 70 |
| 4 | 1 : 1 | 60 min./90° C | 0 |

We claim:
1. A process for the preparation of thioformanilide, which comprises reacting an equivalent weight of phenyl isothiocyanate and at least two equivalents of sodium borohydride in an inert organic solvent in which they are mutually soluble at a temperature not exceeding 40° C. until heat is no longer evolved, thereby producing thioformanilide, and isolating the thioformanilide from the reaction mixture.

2. A process for the preparation of thioformanilide, which comprises reacting an equivalent weight of phenyl isothiocyanate and at least two equivalents of sodium borohydride in an inert organic solvent in which they are mutually soluble at a temperature not exceeding 40° C. until heat is no longer evolved thereby producing thioformanilide, combining the reaction mixture containing the thioformanilide with ice water acidified with hydrochloric acid to decompose any unreacted sodium borohydride and any intermediate-formed boron-containing complex present therein, filtering the resulting mixture to isolate the thioformanilide, and crystallizing the thioformanilide from water to obtain it.

3. The process of claim 2 wherein the inert organic solvent is the dimethyl ether of diethylene glycol.

4. The process of claim 2 wherein the inert organic solvent is dioxane.

5. A process for the preparation of thioformanilide, which comprises reacting an equivalent weight of phenyl isothiocyanate and at least two equivalents of sodium borohydride in an inert organic solvent in which they are mutually soluble at a temperature not exceeding 40° C. until heat is no longer evolved thereby producing thioformanilide, combining the reaction mixture containing the thioformanilide with ice water acidified with hydrochloric acid to decompose any unreacted sodium borohydride and any intermediate-formed boron-containing complex present therein, heating the resulting acidified aqueous mixture at about 70° C. to remove dissolved gases and to disperse the sticky, insoluble thioformanilide therein, cooling the resulting aqueous dispersion to precipitate the thioformanilide, filtering the resulting mixture to isolate the thioformanilide, and crystallizing the thioformanilide from water to obtain it.

References Cited by the Examiner

Gaylord: "Reduction With Complex Metal Hydrides," pp. 86 and 100–102 (1956).

Ried et al.: Ber. Deut. Chem., vol. 85, pp. 470–474 (1952).

CHARLES B. PARKER, *Primary Examiner.*